United States Patent
Maheshwari et al.

(10) Patent No.: US 11,455,306 B2
(45) Date of Patent: Sep. 27, 2022

(54) QUERY CLASSIFICATION AND PROCESSING USING NEURAL NETWORK BASED MACHINE LEARNING

(71) Applicant: Oracle International Corporation, Redwood Shores, CA (US)

(72) Inventors: Arvind Kumar Maheshwari, Pleasanton, CA (US); Vamshidhar Reddy Pasham, Hyderabad (IN); Shantanu Mahajan, Bangalore (IN); Debottam Kundu, Kolkata (IN)

(73) Assignee: Oracle International Corporation, Redwood Shores, CA (US)

(*) Notice: Subject to any disclaimer, the term of this patent is extended or adjusted under 35 U.S.C. 154(b) by 221 days.

(21) Appl. No.: 16/747,919

(22) Filed: Jan. 21, 2020

(65) Prior Publication Data
US 2021/0224275 A1   Jul. 22, 2021

(51) Int. Cl.
*G06F 16/2453* (2019.01)
*G06N 3/04* (2006.01)
(Continued)

(52) U.S. Cl.
CPC ...... *G06F 16/24542* (2019.01); *G06F 16/285* (2019.01); *G06N 3/0445* (2013.01); *G06N 3/08* (2013.01)

(58) Field of Classification Search
CPC ............ G06F 16/24542; G06F 16/285; G06N 3/0445; G06N 3/08
See application file for complete search history.

(56) References Cited

U.S. PATENT DOCUMENTS 6,108,648 A * 8/2000 Lakshmi ........... G06F 16/24545
2011/0313999 A1* 12/2011 Bruno ............... G06F 16/24542
                                                                707/718
(Continued)

FOREIGN PATENT DOCUMENTS

WO      2018/200979 A1   11/2018

OTHER PUBLICATIONS

Wikipedia contributors. (Jan. 10, 2022). Neural network. In Wikipedia, The Free Encyclopedia. Retrieved 04:45, Jan. 26, 2022, from https://en.wikipedia.org/w/index.php?title=Neural_network&oldid=1064879516 (Year: 2022).*
(Continued)

*Primary Examiner* — William Spieler
(74) *Attorney, Agent, or Firm* — Invoke

(57) ABSTRACT

Techniques are described herein for leveraging recurrent neural networks for query processing. In some embodiments, a query analytic system determines a sequence of tokens for at least a portion of a query and determines a vector representation for each token. The query analytic system further generates, using a neural network based on the sequence of tokens, a performance prediction associated with executing at least the portion of the query, wherein the neural network assigns at least a first weight for at least a first token in the sequence of tokens based at least in part on at least a second token that preceded the token in the sequence. The query analytic system further triggers a responsive action, such as triggering an alert and/or tuning the query, based at least in part on the performance prediction.

20 Claims, 7 Drawing Sheets

(51) Int. Cl.
*G06F 16/28* (2019.01)
*G06N 3/08* (2006.01)

(56) References Cited

U.S. PATENT DOCUMENTS

| | | |
|---|---|---|
| 2015/0269176 A1 | 9/2015 | Marantz et al. |
| 2019/0325292 A1* | 10/2019 | Remis .................. G06F 16/245 |
| 2019/0384863 A1* | 12/2019 | Sirin ...................... G06N 5/022 |
| 2020/0349161 A1* | 11/2020 | Siddiqui ................ G06N 20/20 |
| 2021/0034588 A1* | 2/2021 | Burger .............. G06F 16/24542 |
| 2021/0056108 A1* | 2/2021 | Shmueli .................. G06N 3/08 |

OTHER PUBLICATIONS

Sak et al., "Long Short-Term Memory Recurrent Neural Network Architectures for Large Scale Acoustic Modeling", 15th Annual Conference of the International Speech Communication Association, Sep. 14-18, 2014, 5 pages.
Basik F. et al., "DBPal: A Learned NL-Interface for Databases," Proceedings of the 2018 International Conference on Management of Data, May 2018, pp. 1765-1768.

* cited by examiner

QUERY CLASSIFICATION AND PROCESSING USING NEURAL NETWORK BASED MACHINE LEARNING

TECHNICAL FIELD

The present disclosure relates to machine learning and query processing systems. In particular, the present disclosure relates to training, tuning, and leveraging neural networks for optimizing query performance.

BACKGROUND

Software that performs well in development, quality assurance, and staging environment sometimes does not perform well in production environments. One of the primary reasons is that database query performance may vary significantly between the testing and production environments. In some cases, a drop in performance may be caused by a poorly written query, such as a query that leads to an inefficient indexing or join operation. In other cases, the query may be correctly written but expensive to run against large datasets. Problematic queries may go unnoticed in the testing environment where the data volume is typically constrained. However, when an application is scaled up to a larger production environment, the performance impact of running queries on large datasets may become much more noticeable. Application response times, usability, errors, and other performance metrics may be negatively affected.

One approach to reduce unforeseen drops in query performance between different environments is to ensure that the environment datasets are similar in size and format. For example, a system administrator may ensure that there are a similar number of rows in each table and similar cardinality across tables of the different environments. The system administrator may further ensure that the database schemas and other relationships are similar between the environments. While this approach may improve the predictability of query performance, it may be a time-consuming, resource-intensive process. Generally, a production environment is constantly changing, requiring frequent updates to synchronize the development environment. The resource costs of synchronization may be unacceptable for many applications.

Another approach to reduce unforeseen drops in query performance is for an expert database administrator to review every database query before deployment in production. This approach leverages domain knowledge to isolate queries that may be problematic. However, the approach may be unfeasible in large-scale system, where a database administrator may not have enough bandwidth to review each new query in a timely manner. Further, the review process may be error-prone and tedious, requiring the review of relatively large numbers of queries for each problematic query identified.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
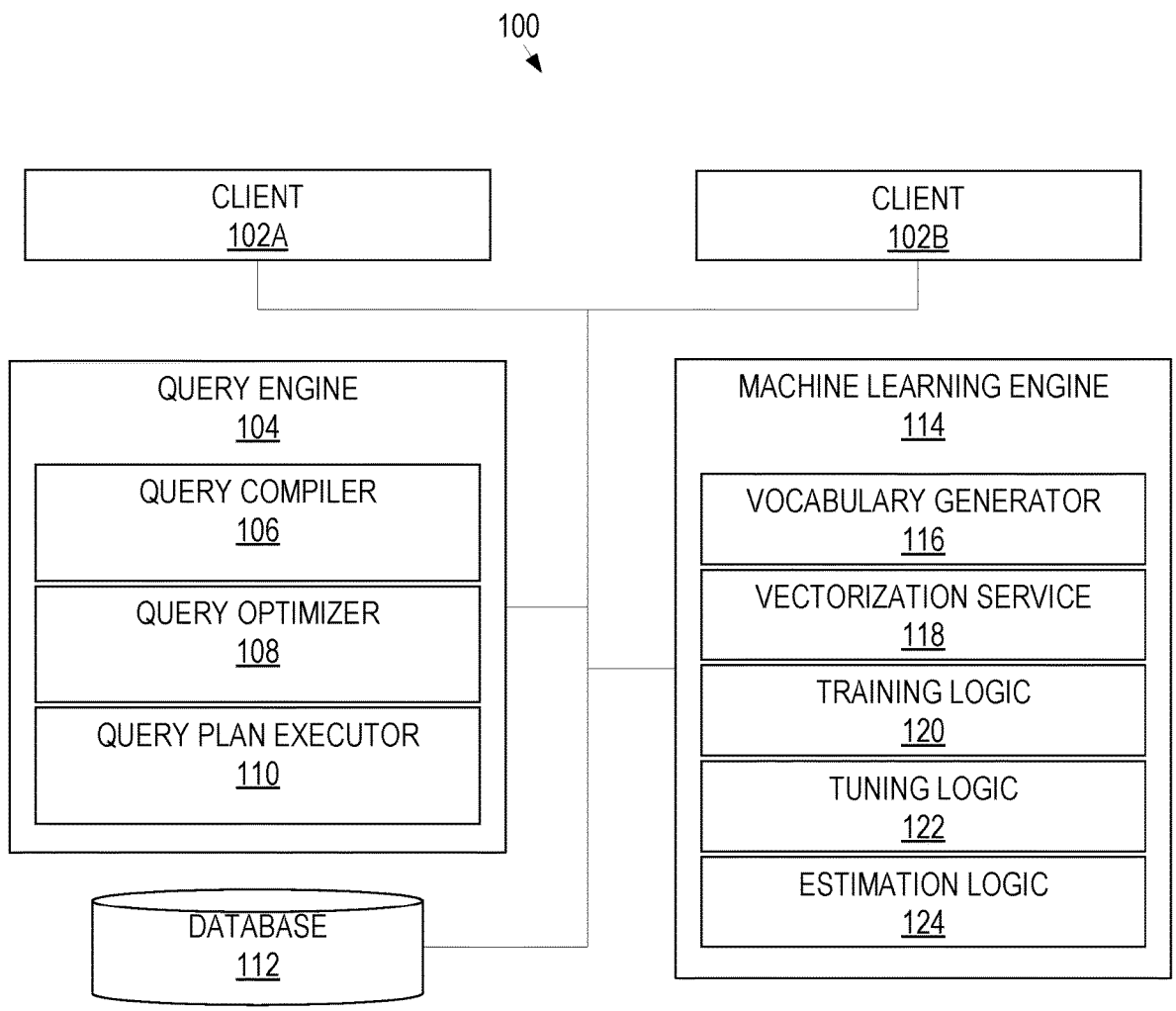
FIG. 1 illustrates an example query classification and processing system with neural network machine learning in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW
2.0 SYSTEM ARCHITECTURE
3.0 RECURRENT NEURAL NETWORK MODEL
   3.1 MODEL OVERVIEW
   3.2 WORD EMBEDDINGS AND PREPROCESSING
   3.3 MODEL TRAINING
   3.4 MODEL TUNING
4.0 QUERY PROCESSING AND CLASSIFICATION
   4.1 NEURAL NETWORK BASED QUERY CLASSIFICATION
   4.2 ALERTS, TUNING, AND OTHER RESPONSIVE ACTIONS
5.0 COMPUTER NETWORKS AND CLOUD NETWORKS
6.0 MICROSERVICE APPLICATIONS
7.0 HARDWARE OVERVIEW
8.0 MISCELLANEOUS; EXTENSIONS 1.0 General Overview Techniques are described herein for query processing and classification using neural network based machine learning. In some embodiments, the techniques include training a recurrent neural network using a set of database queries to automatically learn patterns that are predictive of query performance. When a new query is received, the trained neural network may generate a performance prediction for the new query. Appropriate responsive action may be taken based on the predicted performance. For example, if the predicted performance does not satisfy a threshold, then an alert may be triggered to notify an administrator, the query may be tuned to optimize performance, and/or other automated responsive actions may be taken to address the predicted performance issues for the query.

In some embodiments, the training process for the neural network model includes tokenizing queries and encoding query tokens using word embeddings. A given database query may be represented as a sequence of tokens (also referred to as "words"). A word embedding model may encode query tokens as numerical vectors within a vector space based in part on query contextual information such that vectors for tokens with similar query contexts are placed closer together within the vector space than vectors for tokens that have dissimilar (or less similar) query contexts. The word embeddings may facilitate processing by the neural network as it allows the machine learning model to analyze numerical inputs rather than raw text. The word embeddings further encode contextual information about the queries, which may enhance the insights learned through the training process. The neural network may thus be trained to analyze the semantics present in queries to learn the broader differentiating structures and patterns present in performant and non-performant query expressions.

In some embodiments, the techniques herein include training a recurrent neural network such that nodes (also referred to herein as "cells") within the network include a memory. Without a memory, a single node in a neural network would treat each input independently with little to no information about the context in which it occurs. In the case of a structured language, such as SQL, the order of the tokens (i.e., which words precede or succeed a particular word) may carry useful information. For example, the number of tables being queried may carry some information about the number of join conditions that may be required to make the query efficient. Such contextual information would be lost if every token in a query was analyzed in isolation.

In some embodiments, the neural network includes a long short-term memory (LSTM) layer comprising cells with feedback connections. The cells within the LSTM layer may assign weights that are combined by a dense layer to generate performance predictions for a query (or portions of the query, such as particular sequences of query expressions). The feedback connections within the LSTM layer allow for weights to be assigned to a given token based in part on what other tokens, if any, have preceded the given token in the query. Thus, the weight for the given token may be determined, based in part, on the position of the token relative to other tokens in the query. Stated another way, a token may be given a greater or lesser weight depending on the presence and order of other tokens within the query.

In some embodiments, a cell within the neural network comprises a mechanism to forget irrelevant information. For example, the feedback connection may be connected to a forget gate that controls which information is discarded from a previous cell state. If a given token within a query has little or no bearing on other query tokens, then the forget gate may be trained to discard the cell state when analyzing downstream tokens.

Once trained, the neural network may be used to predict the performance of new queries, even if the queries have not been previously executed in a development or production environment. When a new query is received, it may be tokenized and converted into word embeddings in the same manner as performed for the training process. The sequence of word embeddings may then be fed as input into the recurrent neural network, where the cells use weights and apply activation functions to output values that are fed through a dense layer to generate the prediction.

In some embodiments, generating a prediction includes assigning a descriptive label to the query or query portion. For example, the query may be labeled as good or performant if the predicted performance satisfies a threshold and expensive or non-performant if the threshold is not met. Additionally or alternatively, the prediction may estimate one or more metrics associated with executing the query, such as predicted execution times, input/output throughput, and/or other execution costs. The predictions may be used to trigger one or more automated responsive actions, as described further herein.

One or more embodiments described in this Specification and/or recited in the claims may not be included in this General Overview section.

2.0 System Architecture

FIG. 1 illustrates an example query classification and processing system with neural network machine learning in accordance with some embodiments. As illustrated in FIG. 1, system 100 includes clients 102*a-b*, query engine 104, database 112, and machine learning (ML) engine 114. System 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In some embodiments, clients 102*a* and 102*b* are applications or application components that submit requests to store and fetch data to/from database 112. The requests may include or be used to construct a database query that conforms to a structured language, such as SQL. For example, a software application or component within an application layer of a multi-tier application (e.g., an application server) may submit a data manipulation language (DML) command to add, delete, and/or modify data within database 112. As another example, a client may submit a data definition language (DDL) command to define, modify, and remove the data structures (e.g., tables, database schemas) that control how the underlying data is stored and related.

Query engine 104 processes incoming queries received from database clients, including client 102*a-b*. In some embodiments, query engine 104 is a component of a database server that provides database services to other computing applications and network hosts. Clients 102*a-b* may be remote from the database server and submit the requests over one or more network connections, or may reside on the same network host as query engine 104.

Query engine 104 generally comprises query compiler 106, query optimizer 108, and query plan executor 110 In some embodiments, query compiler 106 generates query execution plans for incoming queries. Query compiler 106 may include a parser for performing syntactic and semantic processing. The parser may separate portions of a query (e.g., different SQL expressions in a SQL statement) into data structures, such as row source operators, representing steps of a query execution plan. A row source operator defines what data flows in, any operations performed on the data, if any, and what data flows out for a given step of the query execution plan. Each step of the plan may correspond to one or more operations, such as performing scans, joins, deletes, updates, numerical operations, logical operations, data segmentation, etc. A query execution plan may comprise a tree of steps (e.g., row source operators) where the output of one step flows as input to a parent step in the tree until a final query result is generated.

In some embodiments, query compiler 106 checks one or more caches to determine whether code may be reused for the query. If a submitted SQL statement matches one that has been cached, then the code that was previously generated by query compiler 106 may be reused. A soft parse allows optimization and plan generation to be skipped, which may reduce query execution times. If existing code cannot be reused, then a hard parse may be performed, where a new set of one or more execution plans is generated and optimized.

In some embodiments, query optimizer 108 evaluates different possible candidate query execution plans and selects one of the candidates to execute the query. As previously indicated, each query execution plan may comprise a set of steps that may be executed by query plan executor 110 to generate a query result. There may be several possible different combinations of steps that produce the same correct query result. In some cases, query optimizer 108 may select the execution plan with the lowest estimated cost. However, other heuristics and/or rules may also be used to select query execution plans, depending on the particular implementation. Once the candidate query execution plan had been selected, query compiler 106 may convert the execution plan into code that is executable by query plan executor 110.

Query plan executor 110 executes the code of the optimized query execution plan to fetch, manipulate, and/or store data to/from database 122. For example, query plan executor 110 may perform a full table scan, build an index, perform a join, and/or execute other database operations to provide a final query result.

Database 112 may be stored on any type of storage unit and/or device. Further, database 112 may include multiple different storage units and/or devices. The multiple different storage units and/or devices may or may not be of the same type or located at the same physical site. Further, database 112 may be implemented on the same computing system as other components of system 100 or may reside on a separate computing system (e.g., a separate network host). In some embodiments, database 112 is implemented by a storage server. Other components of system 100 may be communicatively coupled to database 112 via a direct connection or via a network.

ML engine 114 provides components through which inferences about query performance and adjustments to database queries may be automatically made during query runtime rather than relying on static instruction sets to perform tasks. In some embodiments, ML engine 114 may be configured to automatically learn and infer query patterns that are predictive of poor runtime performance and good runtime performance. ML engine 114 may automatically flag, modify, and/or otherwise perform responsive actions when performance for a query is predicted to be below a threshold to help optimize query performance at runtime. Additionally or alternatively, ML engine 114 may provide hints to query optimizer 108 for optimizing a query. For example, ML engine 114 may predict that rewriting one or more portions of a SQL statement will yield better query execution times. Query optimizer 108 may use the hints to select and/or rewrite poorly written database queries.

In some embodiments, ML engine 114 includes vocabulary generator 116, which receives a set of queries or query expressions as input and automatically constructs a vocabulary based on extracted query tokens. A query token may be a data object, such as a string value, that identifies one or more words of a query text. For example, a query token may correspond to a database command (e.g., a SELECT, UPDATE, INSERT INTO, DELETE, CREATE TABLE, or other SQL statement), a clause (e.g., a WHERE, FROM, FOR, etc.), a predicate (e.g., specified conditions that may be evaluated to true, false, or unknown), and/or a reference to a database object (e.g., a table, view, or database schema name). A token may uniquely identify a single word, referred to as unigram, or a sequence of two or more words, referred to as an n-gram.

ML engine 114 may further include vectorization service 118, which is configured to generate ML vector representations for queries and/or query tokens. An ML vector representation may be a set of numerical values that facilitate processing by other components of ML engine 114. In some embodiments, each unique token may be mapped to a unique vector representation. For example, a SELECT statement may be represented by one ML vector, a WHERE clause by another, etc.

In some embodiments, vectorization service 118 is a word embedding service that generates a set of word embeddings for an input set of query tokens. A word embedding is a vector representation that may be generated based on the contextual information. In standard word embedding models, such as the continuous bag-of-words model or the skip-gram model, words are assigned to points within a vector space based on linguistic context and similarity. However, natural language processing may have limited utility for structured languages, such as SQL, which instead targets data retrieval, manipulation, and storage. In some embodiments, vectorization service 118 comprises a word embedding model that accounts for query contextual information. The word embedding model may capture which query tokens share similar query contexts and define a vector space such that query tokens with similar contexts have corresponding vectors that are placed closer together than vector representations for dissimilar query tokens.

ML engine 114 may further include training logic 120 for training a neural network. In some embodiments, training logic 120 receives, as input, a set of labeled queries and trains a set of nodes of a neural network, as described further herein. A label may be descriptive in nature or may capture one or more metric values. For example, each query may be labeled as performant or non-performant to train an ML model that classifies queries accordingly. As another example, each query may be labeled with an associated total execution time, compile time, I/O throughput, and/or other execution metrics. Based on the labels and the associated queries, training logic 120 may set and adjust weights and/or other parameters for each neuron/cell. A trained model may be used to classify and/or predict one or more performance metrics associated with executing a new query based on learned query patterns even though the new query has not previously been seen or executed within an environment.

ML engine 114 may further include tuning logic 122 for adjusting and refining model parameters to optimize the model accuracy. For example, tuning logic 122 may train multiple candidate neural network models using varying model parameter sets. Tuning logic 122 may determine which model yields the lowest prediction/estimation error on average and select these parameters to evaluate new queries.

ML engine 114 may further include estimation logic 124 for evaluating new queries using the trained machine learning model. For example, estimation logic 124 may (a) classify a new query as performant or non-performant and/or (b) predict one or more performance metrics associated with executing the query, As previously noted, estimation logic 124 may apply the trained machine learning model to queries that have never been seen or executed within a production and/or testing environment. Even though a query is new to an environment, a recurrent neural network model, described further herein, was observed to generate accurate estimates based on learning which SQL patterns and query feature were predictive of query performance.

In some embodiments, ML engine 114 may comprise or interact with an interface for triggering automated actions based on query performance predictions. For example, ML engine 114 may comprise an interface for interacting with an electronic mail server and/or other notification service. ML engine 114 may trigger, via the interface, an email and/or other notification to alert an administrator if a new query is classified as non-performant or if the predicted performance otherwise does not satisfy one or more thresholds.

Additionally or alternatively, ML engine 114 may provide hints to query optimizer 108 on how to rewrite non-performant queries. For example, ML engine 114 may identify expensive SQL expressions and/or other query attributes that are causing a query to be expensive. Query optimizer 108 may rewrite the query and/or query execution plan, such as by adding a missing lead index column or adding join conditions, based on the input provided by ML engine 114.

Additionally or alternatively, ML engine 114 may periodically trigger reports on the estimated performance of new queries within an environment. For example, a report may list the SQL text for each new query and estimated performance classifications that are descriptive of how the query is expected to perform during execution. Other actions may also be triggered and/or performed by ML engine 114 and/or other components of system 100, depending on the particular implementation, to help optimize query performance.

In some embodiments, ML engine 114 is integrated into a cloud service, such as a software-as-a-service (SaaS) or a web service. Clients, such as clients 102a-b, may be a web browser, mobile application, or other software application communicatively coupled to a network. A client may interact with cloud services using one or more communication protocols, such as the hypertext transfer protocol (HTTP) and/or other communication protocols of the Internet Protocol (IP) suite. In other embodiments, ML engine 114 may be locally accessible to a user, such as a desktop or other standalone application.

In some embodiments, one or more components of system 100 may include a frontend interface for interacting with a user. A frontend interface may be configured to render user interface elements and receive input via user interface elements. For example, a frontend interface may generate webpages and/or other graphical user interface (GUI) objects. Client applications, such as web browsers, may access and render interactive displays in accordance with protocols of the IP suite. Additionally or alternatively, a frontend interface may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

Components of system 100 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Additional embodiments and/or examples relating to computer networks and microservice applications are described below in Section 5.0, titled "Computer Networks and Cloud Networks" and Section 6.0, titled "Microservice Applications".

3.0 Recurrent Neural Network Model 3.1 Model Overview

In some embodiments, ML engine 114 is configured to build a recurrent neural network model for query classification and processing. The neural network model may receive, as input, tagged/labeled historical queries. In some embodiments, the label may be a binary classification, such as good or bad, performant or non-performant, etc. In other embodiments, the labels may include more than two classifications, or may be metric-based, as previously described. The recurrent neural network model may then be trained to distinguish the usage patterns present in the performant queries from the expensive queries with a high degree of robustness.

In some embodiments, the techniques for building and applying the model include:
1. Parsing and converting database queries (e.g., SQL queries) or portions thereof into a numerical input with a one-to-one correspondence between the query tokens/words and their representational numbers;
2. Initializing a recurrent neural network that takes the numerical input and is trained with pre-supplied tags;
3. Training the recurrent neural network to map distinct patterns present in performant and non-performant queries to appropriate outputs (e.g., labels/tags); and
4. Generating, by the trained neural network based on the same schema used for training, whether a query will be performant or non-performant.

Non-performant queries may be flagged and submitted for further review. Additionally or alternatively, the flagged queries may be rewritten or otherwise optimized to improve the predicted performance by the neural network.

Figure 2:
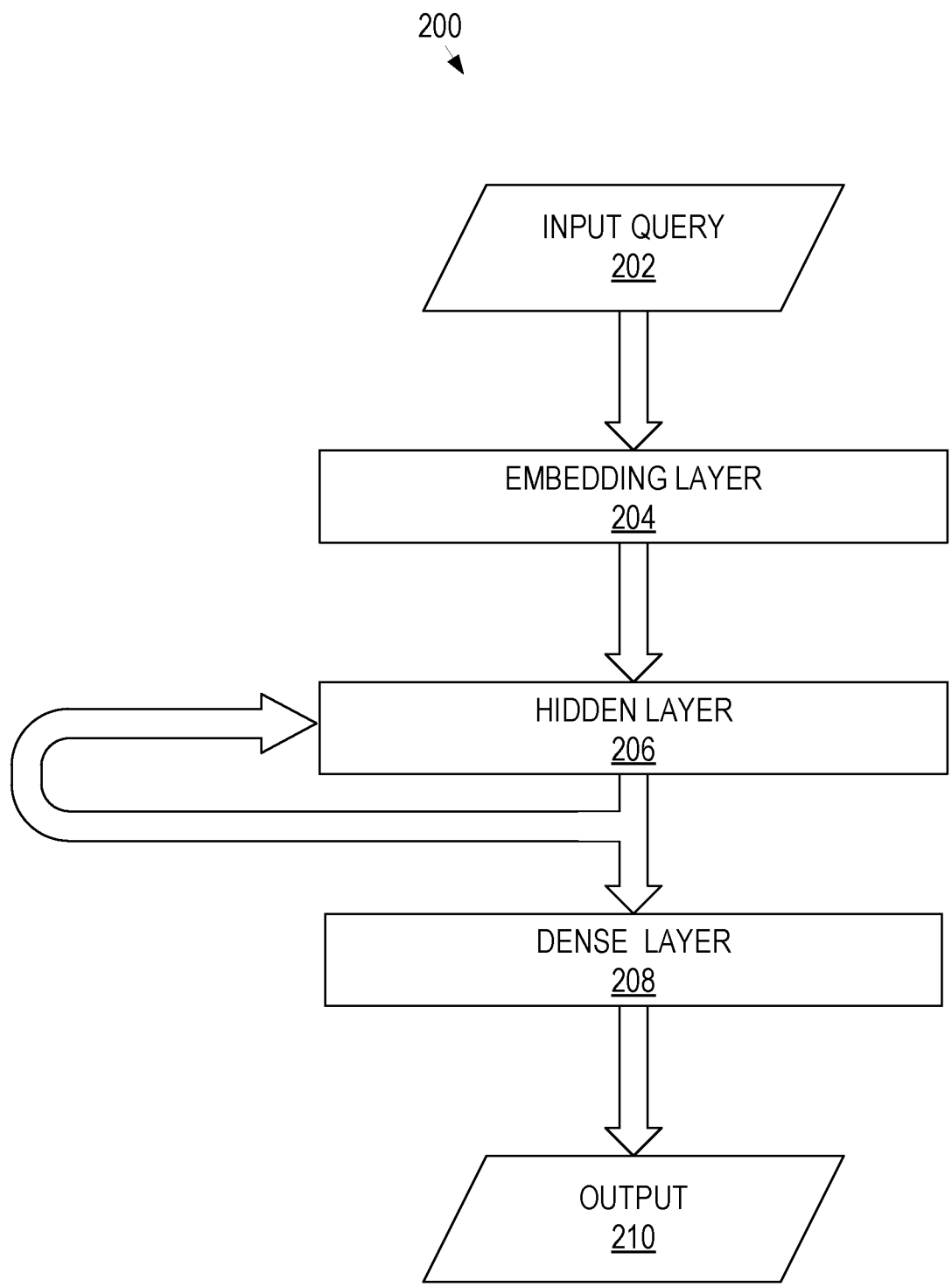
FIG. 2 illustrates an example recurrent neural network model overview in accordance with some embodiments.

FIG. 2 illustrates an example recurrent neural network model overview in accordance with some embodiments. Model 200 receives input query 202 and produces a corresponding output (output 210). Model 200 includes a plurality of layers, where each layer comprises one or more nodes, which may also be referred to as neurons or cells. In some embodiments, model 200 includes the following layers:

Embedding layer 204: The embedding layer transforms each word of a vocabulary into a real-valued vector residing in a vector space where words having similar connotations are closely placed. The embedding layer may correspond to an input layer of the neural network.

Hidden layer 206: The hidden layer comprises a set of nodes (also referred to as neurons or cells), where a node applies a corresponding time-varying real-valued activation functions and/or real-value weight to the inputs. The hidden layer is recurrent in nature, with feedback connections where at least some of the nodes have a memory to remember relevant long-term contextual information. The nodes may also have mechanisms to forget irrelevant information. In some embodiments, the hidden layer is an LSTM layer; however, other types of recurrent neural network models may also be used, depending on the particular implementation.

Dense layer 208: The dense layer is the final layer that determines the output of the model. In some embodiments, the dense layer is a single neuron with an activation function, which shares a connection to at least a subset of nodes in the hidden layer. Given a query, the dense layer produces output 210, which may include a label indicating whether a query is performant or non-performant.

3.2 Word Embeddings and Preprocessing

Some word embedding models, such as the continuous bag-of-words and continuous skip-gram models, are designed to map words to real-valued vectors based on linguistic context determined through natural language processing. However, the words within database queries are generally not limited to literary language, but also involve structure that may be specialized to a particular computing application domain. For example, SQL is a domain-specific computer language for managing data in a relational database management system. The context of a word in a SQL query, such as SELECT, generally has a much different meaning than the same word in a literary context.

In some embodiments, ML engine 114 is configured to train a word embedding model to map query tokens to real-valued vectors based on contextual similarity. ML engine 114 may train a bag-of-words or skip-gram model. However, instead of or in addition to linguistic context, ML engine 114 may train the model based on query contexts, such as functional, structural, and relationship attributes associated with the word. Query tokens that have similar query contexts may be mapped to vectors that are closer together in the vector space than vectors for less similar query tokens. Stated another way, a vector for a query token may have a smaller Euclidean distance and/or greater cosine similarity to another vector in the vector space for a token that has a more similar query context than for a token that is not as similar.

Functional attributes may be determined based on one or more functional operations executed for a given word. For instance, database commands (e.g., SELECT, UPDATE, DELETE, and CREATE TABLE, etc.) and clauses/predicates (e.g., WHERE x=1) convey a certain functional meaning to a given SQL query. Such functional attributes may be factored in when training and applying a bag-of-words model. Thus, query tokens with similar functional contexts may be mapped to vectors that are more closely placed within the vector space.

Structural and relationship attributes may be determined based on learned and/or predefined patterns within the database. For example, database schemas and/or other metadata may define relationships between database objects. In other cases, relationships may be learned based on access patterns, such as frequent cooccurrences in joins and/or other query operations. Query tokens corresponding to related database objects may be mapped more closely together than for unrelated objects. Additionally or alternatively, other information may be used when training the model, such as the size (e.g., the number of rows) of a database object, the uniqueness of rows, and/or other object attributes.

Once trained, the word embedding model may be used to generate numerical vector representations for query tokens. For example, query token $x_1$ may be mapped to the word embedding vector 110, query token $x_2$ to 001, and query token $x_3$ to 111. In this example, query token $x_1$ and $x_3$ are closer together indicating a greater similarity in query context than to token $x_2$. It is noted that the length of the word embedding vector may be much longer and may vary depending on the particular implementation.

A given query may be represented as a set of word embedding vectors. For instance, a query comprising four query tokens may be represented by the four corresponding word embedding vectors for each token. The length of a query representation may be normalized, using padding and/or substitution, as described further herein, to facilitate processing by the neural networking model.

Figure 3:
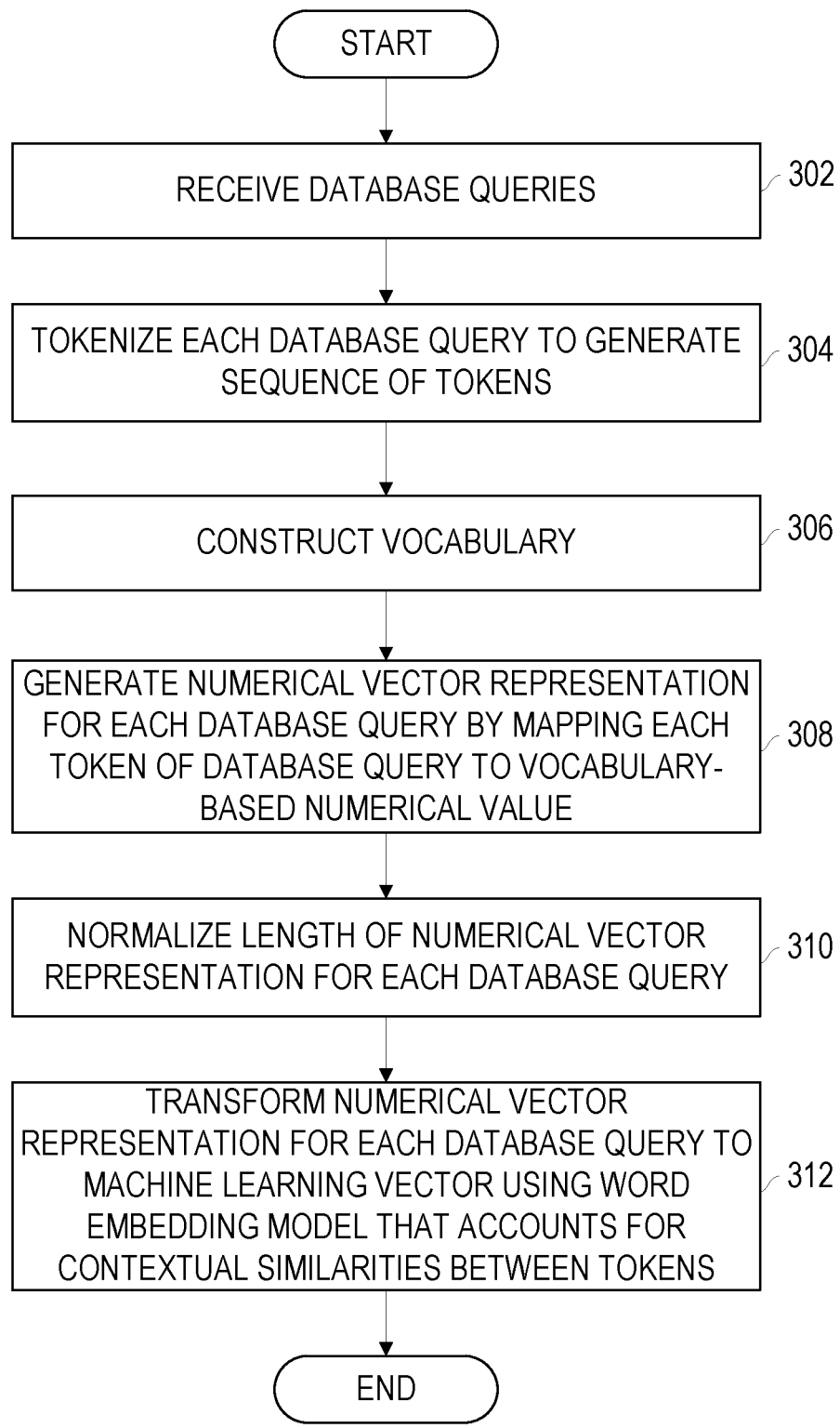
FIG. 3 illustrates an example set of operations for generating word embeddings for query tokens in accordance with some embodiments.

FIG. 3 illustrates an example set of operations for generating word embeddings for query tokens in accordance with some embodiments. One or more operations illustrated in FIG. 3 may be modified, rearranged, or omitted. Accordingly, the particular sequence of operations illustrated in FIG. 3 should not be construed as limiting the scope of one or more embodiments.

The set of operations includes receiving a set of raw database queries (operation 302). In some embodiments, a raw database query is a SQL query. However, the query format may vary depending on the particular implementation.

The set of operations further includes tokenizing each database query to generate a corresponding sequence of tokens (operation 304). For example, the database query <SELECT Name, City FROM Emp> may be tokenized to extract the following sequence of query tokens/words:

1. SELECT
2. Name
3. City
4. FROM
5. Emp

The number, order, and types of query tokens may vary from one query to another.

Once the queries have been tokenized, vocabulary generator 116 constructs an in-domain vocabulary (operation 306). In some embodiments, the in-domain vocabulary includes a mapping between unique tokens in the corpus of queries and a unique numerical value, such as a dictionary index. The unique dictionary value that is assigned may map to a single word (i.e., a unigram) or multiple words (i.e., an n-gram).

Vectorization service 118 next generates a numerical vector representation for each database query by mapping each token of the database query-based numerical value (operation 308). In some embodiments, each query token is replaced with the unique dictionary value, resulting in a sequence of dictionary values. For instance, the query <SELECT RTS_MONITORING_ENTITIES.TENANT_ID CFG_DATA.KSC2 ENTITY_FOR_CONVERSION.ZDT_GUID FROM RTS_MONITORING_ENTITIES CFG_DATA ENTITY_FOR_CONVERSION WHERE RTS_MONITORING_ENTITIES.TENANT_ID=ENTITY_FOR_CONVERSION.TENANT_ID AND RTS_MONITORING_ENTITIES.ME_ID=ENTITY_FOR_CONVERSION.ME_ID> may be transformed to <3, 24, 53, 156, 4, 35, 9, 38, 5, 24, 1, 48, 2, 40, 1, 56>.

Vectorization service 118 further normalizes the length of the vector representations for each database query (operation 310). Normalization may be performed to ensure that each vector representation has an equal length to facilitate ML model training, tuning, and evaluation. In some embodiments, vectorization service 118 normalizes the length by identifying which query has the maximum length in terms of greatest number of tokens. The other queries may be padded by adding 0's to ensure uniform length. For instance, the above query may be padded to match the length of the longest query vector as follows: <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 3, 24, 53, 156, 4, 35, 9, 38, 5, 24, 1, 48, 2, 40, 1, 56>.

Vectorization service 118 further transforms the numerical vector representation for each database query to an ML vector based on a word embedding model that account for contextual similarities between tokens (operation 312). In the example vector above, the value 3 may be mapped to one word embedding vector, 24, another vector, etc. The 0's may be ignored as these values are added for padding and do not correspond to any query tokens. The word embedding vectors may be assigned by the model based at least in part on query context, as previously described. Thus, placement of each vector within the vector space is determined as a function of contextual similarity such that a corresponding vector for one query token is closer to a vector for another token that is more similar within a query context than a vector for tokens that are less similar.

3.3 Model Training

In some embodiments, ML engine 114 uses the ML vectors generated through the techniques described above to train a recurrent neural network model. The input set of queries may be a historical set of queries that are automatically or manually labeled as non-performant or performant based on execution metrics. Additionally or alternatively, the input set of queries may be labeled with performance metrics. The cell states within the hidden layer may be trained based at least in part on the respective sequence of tokens for each query in the input set of queries and the corresponding labels.

Figure 4:
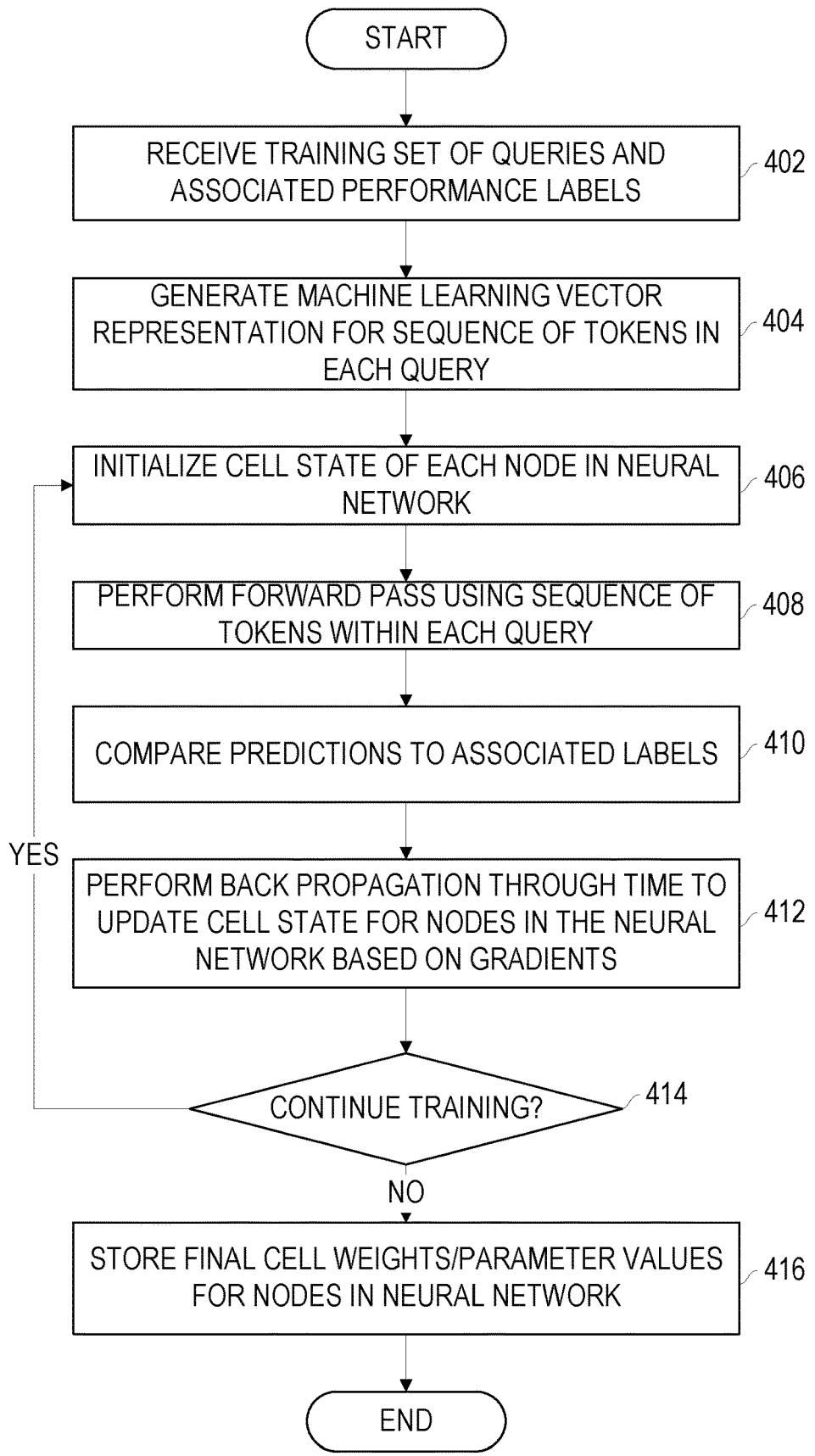
FIG. 4 illustrates an example set of operations for training a recurrent neural network for predicting query performance in accordance with some embodiments.

FIG. 4 illustrates an example set of operations for training a recurrent neural network for predicting query performance in accordance with some embodiments. One or more operations illustrated in FIG. 4 may be modified, rearranged, or omitted. Accordingly, the particular sequence of operations illustrated in FIG. 4 should not be construed as limiting the scope of one or more embodiments.

The set of operations includes receiving a training set of queries and associated performance labels (operation 402).

Responsive to receiving the training set of queries, vectorization service 118 generates a ML vector representation for the sequence of tokens in each query (operation 404). For example, the ML vector representation may be generated according the process depicted in FIG. 3 and described above.

During the training process, ML engine 114 initializes the set of nodes in the recurrent neural network (operation 406). In some embodiments, the cell state, including the cell weights and/or biases, for a node may be initialized with randomly selected values. However, predetermined initial values may also be used, depending on the particular implementation.

ML engine 114 next performs a forward pass using the ML vector representations for the sequence of tokens of each query in the training dataset (operation 408). For a given query, the process of forward propagation may include passing input data, including the sequence of tokens, to hidden layer 206. Each node within the hidden layer 206 applies a corresponding transformation to the input and any feedback received from a previous cell state to generate an output. The node may then send the output to dense layer 208. A node within dense layer 208 may receive the outputs from each node in hidden layer 206 and apply a transformation to generate its own respective output value. This process may be repeated for each query token in the query, using the corresponding ML vector. The dense layer may aggregate the output values to generate a final prediction for the query.

ML engine 114 further compares the predictions obtained through the forward pass with the associated labels to estimate the model error (operation 410). For example, ML engine 114 may determine how many queries the model erroneously predicted were performant that were non-performant and how many were predicted to be non-performant that were performant.

ML engine 114 performs back propagation through to update the cell states in the neural network based on gradients determined as a function of the estimated error (operation 412). With backpropagation, neurons within hidden layer 206 are ascribed a fraction of the total signal of the estimated error based on the contribution to the output. The weights and bias values for the cell may be adjusted using the fractional value. With recurrent neural networks, time may also be factored into the backpropagation process. In the context of the query processing techniques described above, each query token may be processed as a separate discrete instance of time. For example, a query may include query tokens $x_1$, $x_2$, and $x_3$ corresponding to times t, t+1, and t+2, respectively. Back propagation through time may perform adjustments through gradient descent starting at time t+2 and moving backward in time to t+1 and then to t.

In some embodiments, ML engine 114 is configured to train LSTM cells at the hidden layer. As previously mentioned, an LSTM cell has memory of the previous state of a cell. That is, the cell remembers contributions from previous query tokens in the sequence of tokens. Thus, in the previous example, a neuron computing a contribution for $x_3$ may have a memory of the contribution of $x_2$, which has a memory of $x_1$. This memory is also referred to as a feedback connection as the output of a neuron for one time in the discrete time sequence may be used as an input to the next time in the sequence. The gradient descent techniques may account for these feedback connections such that the contribution of one query token to a cell's output may affect the contribution of the next query token in the cell's output. That is the contribution of $x_1$ may affect the contribution of $x_2$, etc.

An LSTM cell may further include a forget gate to discard irrelevant information. For example, the contribution of $x_1$ (e.g., a SELECT statement) may have no effect on the contribution of a downstream token in the sequence, depending on the query context. Stated another way, a cell may be trained to forget tokens and/or take into account other tokens in the sequence of tokens that preceded the current token when applying the cell's activation function. The forget gate of an LSTM cell may control the extent to which a value for the previous query token is remembered by the cell.

ML engine 114 further determines whether to continue adjusting the cell parameters (operation 414). In some embodiments, ML engine 114 repeats operations 406-412 until a loss function is minimized. For example, gradient descent may be used to modify the weights of the neurons in a manner that reduces the gradient until a set of parameters that yield a minimum gradient value (e.g., a value of 0) is identified.

ML engine 114 stores the final cell weights and parameter values for the neural network (operation 416). The trained neural network may then be used to evaluate and estimate labels for new queries.

3.4 Model Tuning

Figure 5:
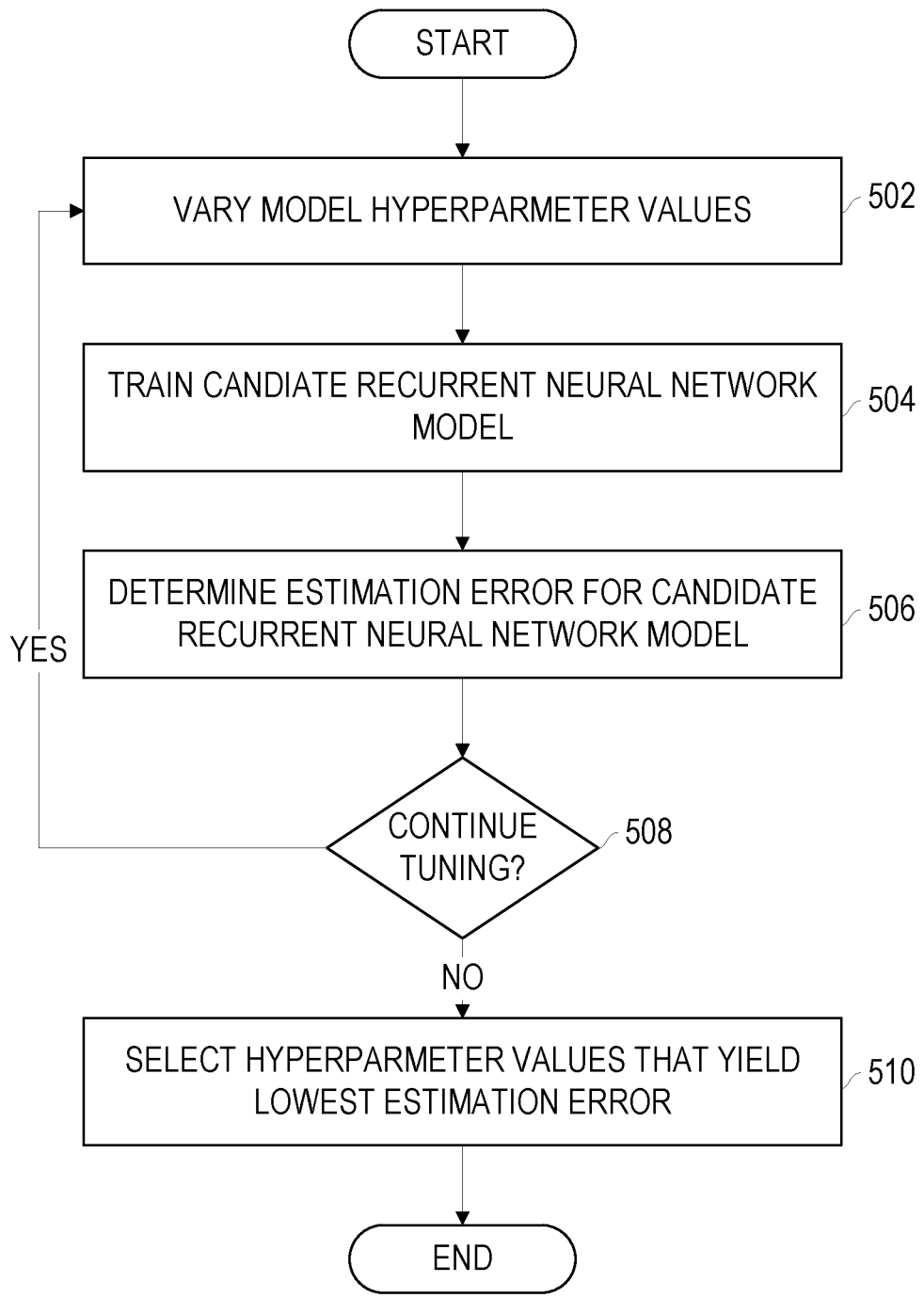
FIG. 5 illustrates an example set of operations for tuning a recurrent neural network in accordance with some embodiments.

In some embodiments, ML engine 114 may tune model hyperparameter values to optimize model performance. FIG. 5 illustrates an example set of operations for tuning a recurrent neural network in accordance with some embodiments. One or more operations illustrated in FIG. 5 may be modified, rearranged, or omitted. Accordingly, the particular sequence of operations illustrated in FIG. 5 should not be construed as limiting the scope of one or more embodiments.

The tuning process includes varying one or more hyperparameter values (operation 502). A hyperparameter in this context refers to a value that is set before training begins. Example hyperparameters that may be varied may include, but are not limited to, the embedding size of the word embedding model, the word embedding features used to create the vector space, the number of cells in hidden layer 206, the activation functions in the cells in hidden layer 206, the activation function in dense layer 208, and/or the error functions for estimating/minimizing model error, ML engine 114 next trains a candidate recurrent neural network model using the new hyperparameter value(s) (operation 504). For example, ML engine 114 may train the model according to the process depicted in FIG. 4 using the new hyperparameter values.

ML engine 114 next determines the estimation error for the candidate model (operation 506). To determine the estimation error, the process may generate estimates for a testing dataset. A testing dataset may include examples that were not used to train the candidate models but for which labels are known. The tuning process may generate a prediction for a respective example in the testing dataset using the candidate model that was trained based on the new hyperparameter value(s) and compare it to the respective known labels. The estimation error for an example in a testing dataset may be computed as a function of the difference between the estimated label and the known label. The estimation error for the candidate model may be computed as the average of the estimation error across all examples in the testing dataset.

ML engine 114 next determines whether to continue tuning (operation 508). For example, the tuning process may iterate through various combinations of hyperparameter values. Additionally or alternatively an estimation error threshold may be set where tuning may stop if the estimation error for one or more of the candidate models is below a threshold.

ML engine 114 next selects the candidate model with the lowest estimation error (operation 510). The selected model may then be used to evaluate new documents according to the corresponding hyperparameter values and the corresponding cell parameters obtained via the training process.

4.0 Query Processing and Classification
4.1 Neural Network Based Query Classification In some embodiments, ML engine 114 uses the trained recurrent neural network model to predict the performance of queries that are new to an environment. When a new query is received, it may be tokenized and converted into word embeddings in the same manner as previously described for queries in the training dataset. ML engine 114 may then perform a forward pass of the sequence of word embedding vectors through the trained neural network to generate the prediction.

Figure 6:
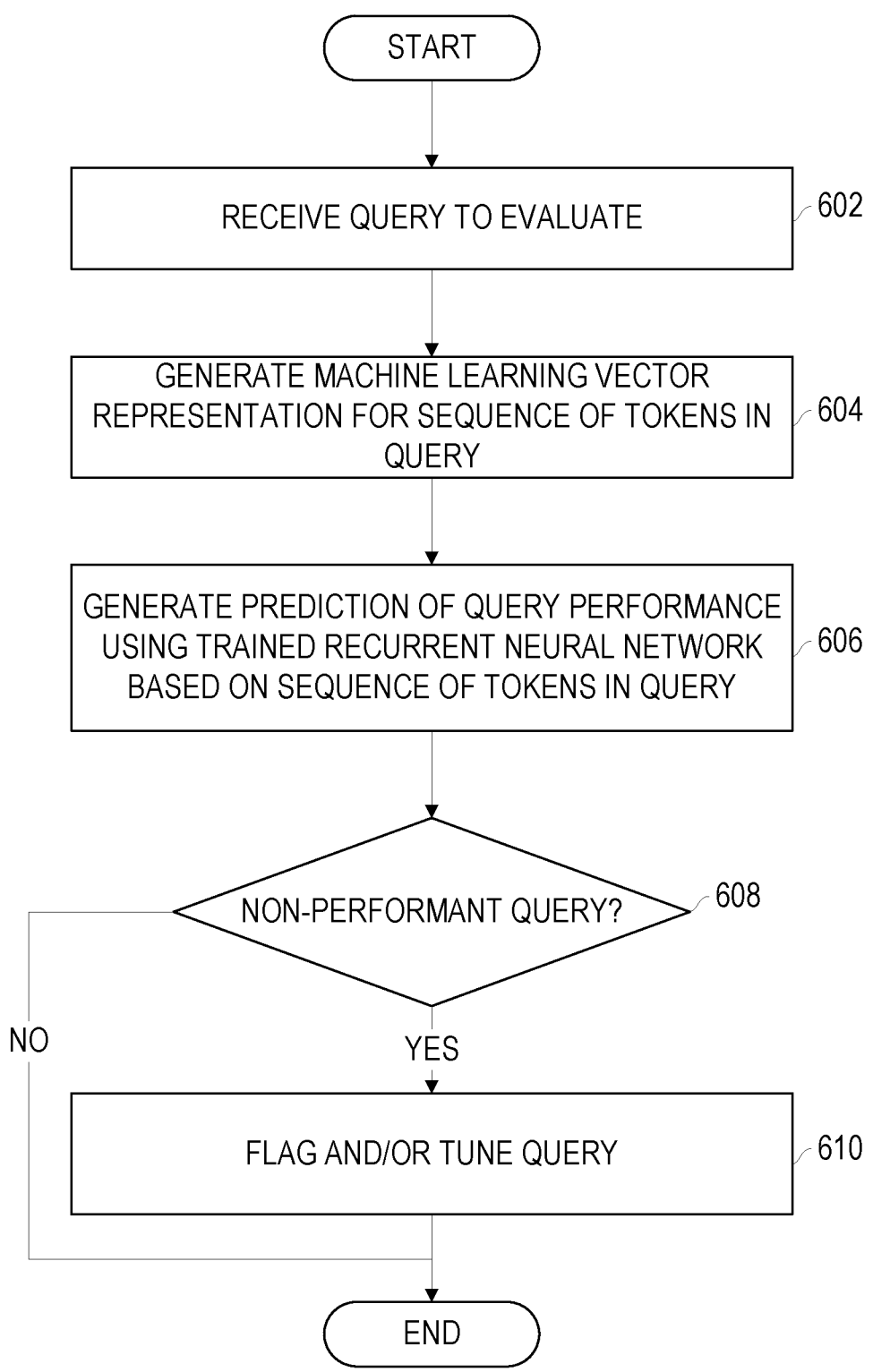
FIG. 6 illustrates an example set of operations for using a neural network to process queries based on predicted performance in accordance with some embodiments.
Figure 7:
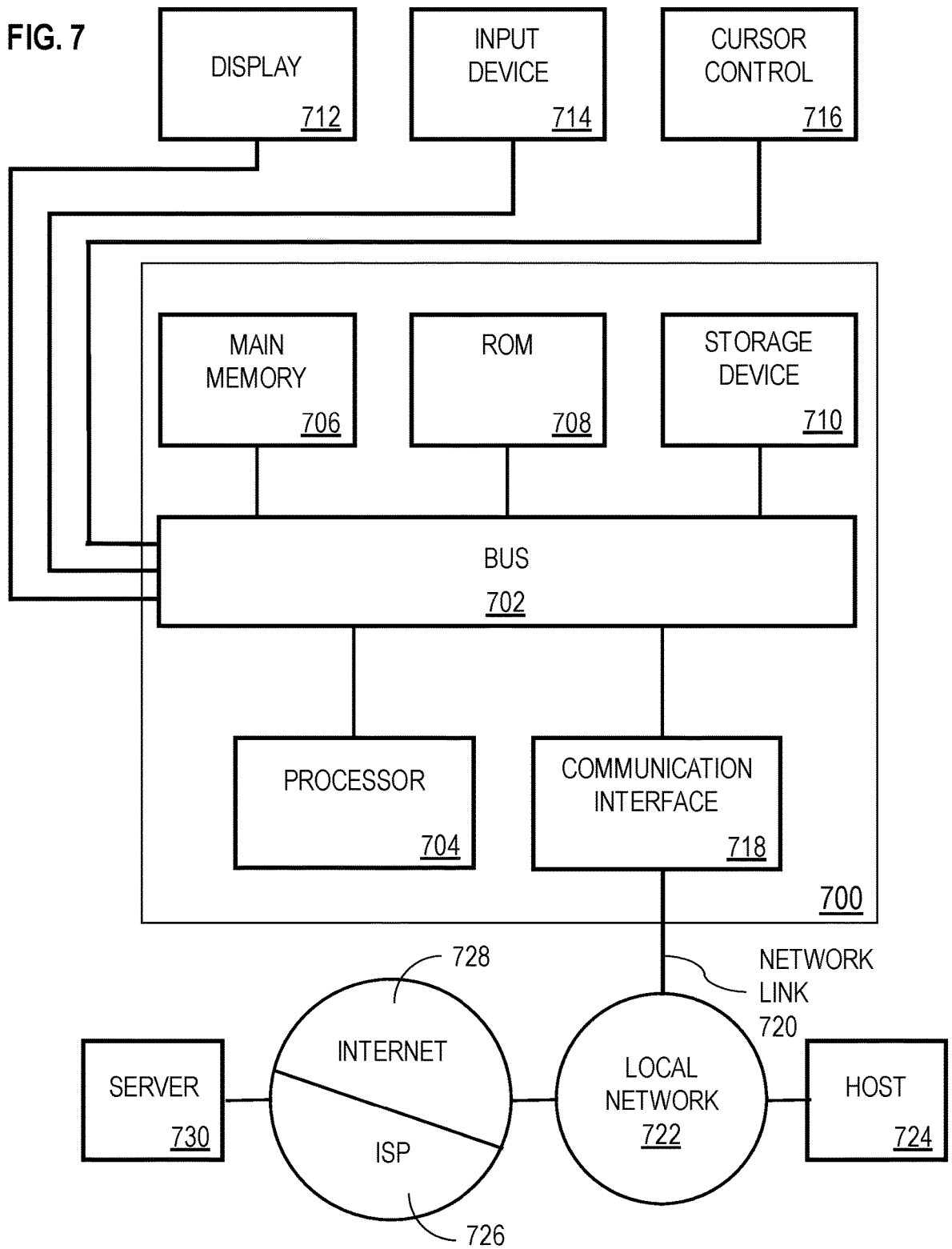
FIG. 7 shows a block diagram that illustrates a computer system in accordance with one or more embodiments.

FIG. 6 illustrates an example set of operations for using a neural network to process queries based on predicted performance in accordance with some embodiments. One or more operations illustrated in FIG. 6 may be modified, rearranged, or omitted. Accordingly, the particular sequence of operations illustrated in FIG. 6 should not be construed as limiting the scope of one or more embodiments.

The set of operations comprise receiving a query to evaluate (operation 602). For example, the query may be a SQL statement received from an application within a production or cloud computing environment.

Responsive to receiving, the query, ML engine 114 generates an ML vector representation for a sequence of tokens in the query (operation 604). ML engine 114 may employ the same process to generate the ML vector as used for queries in the training dataset and previously described. For example, ML engine 114 may map each query token in the query to a respective word embedding vector where placement of the vector within the word embedding vector space accounts for query contextual information.

ML engine 114 next performs a forward pass through the trained recurrent network model using the ML vector representation for the sequence of tokens to generate a prediction of query performance (operation 606). In some embodiments, the prediction produces an estimated label that classifies the query as performant or non-performant. Additionally or alternatively, the estimated label may include a prediction of execution metrics, such as predicted execution time, and/or an uncertainty associated with the model's prediction.

ML engine 114 may further determine whether the query has been classified as non-performant or if the predicted execution metrics do not satisfy a threshold (operation 608).

If the new query is predicted to be non-performant by the recurrent neural network model, then the query may be flagged for review and/or tuned to optimize performance (operation 610). Additionally or alternatively, other responsive actions may be automatically triggered or otherwise taken to address queries that are predicted to be problematic within the environment.

In some embodiments, the recurrent neural network model accounts the order of tokens when evaluating a new query. As previously indicated, the recurrent neural network is able to capture patterns in the query context including the query order. Certain sequences of tokens may be predictive of performant or expensive queries. The words which precede and/or succeed a particular query token may affect the outputs of one or more cells within the neural network.

In some cases, a query token may increase the weight given by a cell to another token (either preceding or succeeding) in the sequence of tokens that are fed into the neural network. In other cases, a query token may decrease the weight given by the cell to another token. For example, a join involving two tables with several million rows may be costly to evaluate whereas a join of a table in isolation with a much smaller table may be efficiently executed. If the query tokens following a join operation are two large tables, then the weights may be multiplied or otherwise affect each other via the feedback connections in the LSTM layer to classify the query as non-performant. As another example, the number of tables being queried may encode information about the number of join conditions that needs to be applied to make the query efficient. A sequence of join conditions may increasingly reduce the weight/likelihood of classifying the query as non-performant, where the weight given to a given join condition is based upon the join conditions that preceded it, if any.

Training and evaluating the recurrent neural network per the techniques above was observed to automatically learn the below patterns predictive of good queries and expensive queries in TABLE 1 below without explicitly encoding these patterns into the model.

TABLE 1

PERFORMANT AND NON-PERFORMANT QUERY TEMPLATES

Good Query Templates
- Join queries with threshold of join conditions present
    - Two table joins
        - SELECT <a.COL1, b.COL2> FROM a, b WHERE a.id = b.id
    - Multiple table joins
        - SELECT <a.COL1, b.COL2,c.COL3> FROM a, b, c WHERE a.id = b.id and b.id=c.id
        - SELECT <a.COL1, b.COL2,c.COL3,d.COL4> FROM a, b, c, d WHERE a.id = b.id and b.id=c.id and c.id=d.id
        - SELECT <a.COL1, b.COL2,c.COL3,d.COL4,e.COL5> FROM a, b, c, d, e WHERE a.id = b.id and b.id=c.id and c.id=d.id and d.id=e.id
- Select queries with time-based filters on data tables
    - SELECT <AVG/MIN/MAX/SUM COL1> FROM a WHERE a.tenant_id=:1 and a.me_id=:2 and a.timestamp<:3
    - SELECT <AVG/MIN/MAX/SUM COL1> FROM a WHERE a.tenant_id=:1 and a.me_id=:2 and a.timestamp>:3
    - SELECT <AVG/MIN/MAX/SUM COL1> FROM a WHERE a.tenant_id=:1 and a.me_id=:2 and a.timestamp BETWEEN :3 and :4
    - SELECT <AVG COL1, MAX COL2 >FROM a WHERE a.tenant_id=:1 and a.me_id=:2 and a.timestamp<:3
- Select queries with filters on partition columns or indexed columns
    - SELECT <COL1> FROM a WHERE <clauses on all indexed columns>
        - The indexed columns depend on the particular table schema.
        - The columns are conditioned in the strict order of their indexing.
    - SELECT <COL1> FROM a WHERE a.tenant_id=:1 and a.me_id=:2

Expensive Query Templates
- Join queries with threshold join conditions not included
    - Two table joins
        - SELECT <a.COL1,b.COL2> FROM a, b
    - Multiple table joins (one or more join conditions are missing)
        - SELECT <a.COL1,b.COL2,c.COL3> FROM a, b, c WHERE a.id = b.id
        - SELECT <a.COL1,b.COL2,c.COL3,d.COL4> FROM a, b, c, d WHERE a.id = b.id and b.id=c.id
        - SELECT <a.COL1,b.COL2,c.COL3,d.COL4,e.COL5> FROM a, b, c, d WHERE a.id = b.id and b.id = c.id and c.id = d.id
- Select queries with non-performant patterns using Like, upper or not in on indexed columns.
    - SELECT <COL1> FROM a WHERE a.tenant_id !=:1
    - SELECT <COL1> FROM a WHERE a.tenant_id NOT IN :1
    - SELECT <COL1> FROM a WHERE a.me_id LIKE :1
    - SELECT <COL1> FROM a WHERE upper(a.me_id) = :1
    - Select queries with clauses on indexed columns, but not in strict succession.
    - SELECT <COL1> FROM a WHERE <clauses on indexed columns, but not on the leading index>
        - Say the index for table a is (a1,a2,a3,a4).
        - Then the query will be SELECT <COL1> FROM a WHERE a2=:1 and a3=:2 and a4=:3

The recurrent neural network model was able to distinguish between performant and non-performant join operations based on patterns in the number/order of query tokens.

Further, the LSTM layer may be trained to forget irrelevant information. That is, a query token may have no effect on the weight given by a cell to a preceding or succeeding token in the sequence.

In some embodiments, during the evaluation phase, the outputs of the hidden/LSTM layer are fed to a cell within the dense layer, which applies an activation function. Example activation functions may include, but are not limited to, a sigmoid function and a hyperbolic tangent function (tan h). Given the query, the activation function of the dense layer produces a final decision on whether the query is performant or non-performant. As previously mentioned, the output may be a binary classification (e.g., performant or non-performant) or may correspond to a predicted execution metric.

4.2 Alerts, Tuning, and Other Responsive Actions

Expensive queries generally fall into one of two categories: (1) poorly written queries, such as queries with missing leading index columns or missing joins between tables, or (2) queries that are correctly written but have high execution costs against the production dataset. Poorly written queries may be fixed by rewriting the queries or generating new indexes. For correctly written but expensive queries, the functional flow, such as the flow of a user-interface of an application, may be modified to optimize performance (e.g., to reduce the data shown on the UI pages).

For expensive queries in either category, ML engine 114 may be configured to trigger an alert to notify an administrator. Example notifications may include, but are not limited to, email, short message service (SMS), and workflow messages. A user, such as a database administrator (DBA), may set up and customize the alerting system, such as by providing an email address, an SMS number, and/or other information to tailor where the notifications are sent and what notification services are invoked by ML engine 114.

Additionally or alternatively, users may configure one or more conditions for triggering alerts. For example, a DBA may specify a condition that an alert should be trigger for a new query if and only if the predicted execution time is greater than a threshold. As another example, a DBA may specify a condition that an alert should be triggered if and only if a threshold number of new queries in the environment have been classified as non-performant. Other conditions may also be specified, depending on the particular implementation. If the conditions are not satisfied, then the system may continue operating without triggering an alert.

In addition or as an alternative to triggering an alert, ML engine 114 may trigger other responsive actions upon detecting a non-performant query. In some embodiments, ML engine 114 may trigger automatic tuning operations on the query. For example, if a new query is predicted to be non-performant, then ML engine 114 may notify query engine 104. In response, query optimizer 108 may tune the query, such as by rewriting the query and/or generating new indexes for the query.

Additionally or alternatively, ML engine 114 may stop or delay non-performant queries from being executed. For example, if ML engine 114 evaluates a new query and predicts that the query will be non-performant, ML engine 114 may check the overall system workload. If the workload is above a threshold, then ML engine 114 may stop or delay execution of the new query. System resources may instead be directed to execution of more performant queries to allow for greater execution throughput. If total system workload is below the threshold, then the expensive query may be allowed to execute as normal.

Additionally or alternatively, one or more regions of a user interface that are the source of an expensive query may be automatically deactivated until the user interface may be redesigned to reduce the load on the underlying database. For example, the UI flow of an application may be redesigned to present data in smaller chunks such that the amount of data on a given application UI page is reduced, thereby alleviating the load of the SQL queries issued by the application to the database system.

Additionally or alternatively, a user may configure other responsive actions to trigger upon detecting a non-performant query. In some embodiments, triggers and/or actions may be chained together to form recipes of actions that occur in optionally different applications that are otherwise unaware of or have no control or dependency on each other. Users may configure the recipes of action using templates and/or other UI pages to control how system 100 responds to and handles expensive queries.

5.0 Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6.0 Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7.0 Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates computer system 800 upon which some embodiments may be implemented. Computer system 800 includes bus 802 or other communication mechanism for communicating information, and a hardware processor 804 coupled with bus 802 for processing information. Hardware processor 804 may be, for example, a general purpose microprocessor.

Computer system 800 also includes main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes read only memory (ROM) 808 or other static storage device coupled to bus 802 for storing static information and instructions for processor 804. Storage device 810, such as a magnetic disk or optical disk, is provided and coupled to bus 802 for storing information and instructions.

Computer system 800 may be coupled via bus 802 to display 812, such as a cathode ray tube (CRT) or light emitting diode (LED) monitor, for displaying information to a computer user. Input device 814, which may include alphanumeric and other keys, is coupled to bus 802 for communicating information and command selections to processor 804. Another type of user input device is cursor control 816, such as a mouse, a trackball, touchscreen, or cursor direction keys for communicating direction information and command selections to processor 804 and for controlling cursor movement on display 812. Input device 814 typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 800 can receive the data on the network line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

8.0 Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause:

training a neural network using a training set of queries to predict query execution metrics, wherein the neural network includes a memory layer that is trained based at least in part on how tokens are ordered within at least a subset of queries in the training set of queries;

determining a sequence of tokens for at least a portion of a query;

determining a vector representation for each token in the sequence of tokens;

generating, using the neural network based on the vector representation for each token in the sequence of tokens, a prediction for one or more metrics associated with executing at least the portion of the query, wherein the neural network determines at least a first weight for at least a first token in the sequence of tokens and a second weight for at least a second token in the sequence of tokens, based at least in part on at least a first vector representation for the first token and a second vector representation for the second token that preceded the first token in the sequence of tokens, wherein the neural network generates the prediction based at least in part on the first weight and the second weight; and triggering a responsive action based at least in part on the prediction for one or more metrics associated with executing at least the portion of the query.

2. The one or more non-transitory computer-readable media of claim 1, wherein the memory layer is trained to forget at least a third token in the sequence of tokens that preceded the first token.

3. The one or more non-transitory computer-readable media of claim 1, wherein the vector representation is determined based at least in part on a word embedding model that maps an input token to a corresponding vector within a vector space; wherein placement of the corresponding vector within the vector space is determined as a function of contextual similarity such that the corresponding vector is closer to another vector that is more similar within a query context than another vector that is less similar.

4. The one or more non-transitory computer-readable media of claim 3, wherein the contextual similarity is determined based at least in part on query patterns including frequency of cooccurrence of tokens within a training dataset of queries.

5. The one or more non-transitory computer-readable media of claim 1, wherein the sequence of tokens includes at least one database command and at least one reference to a database object.

6. The one or more non-transitory computer-readable media of claim 1, wherein the memory layer is a long short-term memory layer and then neural network further includes a dense layer; wherein the long short-term memory layer
   includes a plurality of cells with feedback connections and connections to the dense layer;
   wherein a set of cell states in the long short-term memory layer are trained based at least in part on a respective sequence of tokens for each query in the training set of queries.

7. The one or more non-transitory computer-readable media of claim 1, wherein generating the prediction comprises assigning a label to the query that is descriptive of how the query is expected to perform during execution.

8. The one or more non-transitory computer-readable media of claim 1, wherein the prediction comprises a predicted execution time for the query.

9. The one or more non-transitory computer-readable media of claim 1, wherein the responsive action comprises at least one of generating an alert or automatically tuning the query based on the prediction.

10. A method comprising:
    training a neural network using a training set of queries to predict query execution metrics, wherein the neural network includes a memory layer that is trained based at least in part on how tokens are ordered within at least a subset of queries in the training set of queries;
    determining a sequence of tokens for at least a portion of a query;
    determining a vector representation for each token in the sequence of tokens;
    generating, using the neural network based on the vector representation for each token in the sequence of tokens, a prediction for one or more metrics associated with executing at least the portion of the query, wherein the neural network determines at least a first weight for at least a first token in the sequence of tokens and a second weight for at least a second token in the sequence of tokens, based at least in part on at least a first vector representation for the first token and a second vector representation for the second token that preceded the first token in the sequence of tokens, wherein the neural network generates the prediction based at least in part on the first weight and the second weight; and
    triggering a responsive action based at least in part on the prediction for one or more metrics associated with executing at least the portion of the query.

11. The method of claim 10, wherein the memory layer is trained to forget at least a third token in the sequence of tokens that preceded the first token.

12. The method of claim 10, wherein the vector representation is determined based at least in part on a word embedding model that maps an input token to a corresponding vector within a vector space; wherein placement of the corresponding vector within the vector space is determined as a function of contextual similarity such that the corresponding vector is closer to another vector that is more similar within a query context than another vector that is less similar.

13. The method of claim 12, wherein the contextual similarity is determined based at least in part on query patterns including frequency of cooccurrence of tokens within a training dataset of queries.

14. The method of claim 10, wherein the sequence of tokens includes at least one database command and at least one reference to a database object.

15. The method of claim 10, wherein the memory layer is a long short-term memory layer and then neural network further includes a dense layer; wherein the long short-term memory layer includes a plurality of cells with feedback connections and connections to the dense layer; wherein a set of cell states in the long short-term memory layer are trained based at least in part on a respective sequence of tokens for each query in the training set of queries.

16. The method of claim 10, wherein generating the prediction comprises assigning a label to the query that is descriptive of how the query is expected to perform during execution.

17. The method of claim 10, wherein the prediction comprises a predicted execution time for the query.

18. The method of claim 10 wherein the responsive action comprises at least one of generating an alert or automatically tuning the query based on the prediction.

19. A system comprising:
    one or more hardware processors;
    one or more non-transitory computer-readable media storing instructions, which when executed by the one or more hardware processors, cause:
    training a neural network using a training set of queries to predict query execution metrics, wherein the neural network includes a memory layer that is trained based at least in part on how tokens are ordered within at least a subset of queries in the training set of queries;
    determining a sequence of tokens for at least a portion of a query;
    determining a vector representation for each token in the sequence of tokens;
    generating, using the neural network based on the vector representation for each token in the sequence of tokens, a prediction for one or more metrics associated with executing at least the portion of the query, wherein the neural network determines at least a first weight for at least a first token in the sequence of tokens and a second weight for at least a second token in the sequence of tokens, based at least in part on at least a first vector representation for the first token and a second vector representation for the second token that preceded the first token in the sequence of tokens, wherein the neural network generates the prediction based at least in part on the first weight and the second weight; and triggering a responsive action based at least in part on the prediction for one or more metrics associated with executing at least the portion of the query.

20. The one or more non-transitory computer-readable media of claim 1, wherein training the neural network comprises training a long short term memory neural network using the training set of queries.

\* \* \* \* \*